US009599736B2

(12) United States Patent
Roger et al.

(10) Patent No.: US 9,599,736 B2
(45) Date of Patent: Mar. 21, 2017

(54) OPERATION MANAGING SYSTEM FOR DRIVING A NAVIGATION CONTROL DEVICE ACCORDING TO A DEGRADED OPERATING MODE (71) Applicant: SERCEL, Carquefou (FR)

(72) Inventors: Thierry Roger, Nantes (FR); Christophe L'Her, Loperhet (FR); Jean-Jacques Vignaux, Carquefou (FR); Christophe Coutineau, Vertou (FR); Dominique Barbot, Locmaria Plouzane (FR); Stephane Rousseau, La Chapelle sur Erdre (FR)

(73) Assignee: SERCEL, Carquefou (FR)

( * ) Notice: Subject to any disclaimer, the term of this patent is extended or adjusted under 35 U.S.C. 154(b) by 231 days.

(21) Appl. No.: 14/508,608

(22) Filed: Oct. 7, 2014

(65) Prior Publication Data
US 2015/0098303 A1   Apr. 9, 2015

(30) Foreign Application Priority Data

Oct. 7, 2013   (EP) .................................... 13306385

(51) Int. Cl.
*G01V 1/38*   (2006.01)
(52) U.S. Cl.
CPC ................... *G01V 1/3826* (2013.01)
(58) Field of Classification Search
CPC .................................... G01V 1/3826
USPC .................................... 367/16, 17
See application file for complete search history.

(56) References Cited

U.S. PATENT DOCUMENTS

| 4,823,325 A * | 4/1989 | Cole, Jr. ................ G01V 1/201 114/245 |
| 6,525,992 B1 | 2/2003 | Olivier et al. |
| 7,080,607 B2 | 7/2006 | Hillesund et al. |
| 7,206,254 B2 | 4/2007 | Oliver et al. |
| 7,933,163 B2 | 4/2011 | Fossum et al. |
| 2008/0008033 A1 | 1/2008 | Fossum et al. |
| 2009/0204274 A1 | 8/2009 | Bittleston |

FOREIGN PATENT DOCUMENTS

| EP | 1031855 A2 | 8/2000 |
| WO | 2009088291 A1 | 7/2009 |
| WO | 2011014071 A2 | 2/2011 |

OTHER PUBLICATIONS

European Search Report and Written Opinion dated Mar. 17, 2014 for corresponding European Application No. 13306385, filed Oct. 7, 2013.

* cited by examiner

*Primary Examiner* — Daniel L Murphy
(74) *Attorney, Agent, or Firm* — David D. Brush; Westman, Champlin & Koehler, P.A.

(57) ABSTRACT

An operation managing system is provided for managing the operation of a navigation control device. The navigation control device is adapted for controlling the depth and/or the lateral position of a towed acoustic linear antenna and including a body to which is attached a set of wings. The operation managing system operates the navigation control device according to a degraded operating mode, by acting on at least one non-released and motorized wing when detecting that at least one wing of the set of wings has been released or must be released.

16 Claims, 5 Drawing Sheets

OPERATION MANAGING SYSTEM FOR DRIVING A NAVIGATION CONTROL DEVICE ACCORDING TO A DEGRADED OPERATING MODE

1. FIELD OF THE DISCLOSURE

The field of the disclosure is the acquisition of geophysics data. It deals with the equipments required in order to study the seabed and its sediment layers properties.

More specifically, the disclosure relates to an operation managing system for driving a navigation control device (commonly referred to as "bird"), such a navigation control device being adapted for controlling the depth and/or the lateral position of a towed acoustic linear antenna (commonly referred to as "streamer").

The disclosure can be applied notably to the oil prospecting industry using seismic method (sea oil survey), but can be of interest for any other field which requires a system performing geophysics data acquisition in a marine environment.

2. TECHNOLOGICAL BACKGROUND

It is sought more particularly here below in this document to describe problems existing in the field of seismic data acquisition for oil prospecting industry. The disclosure of course is not limited to this particular field of application but is of interest for any technique that has to cope with closely related or similar issues and problems.

Figure 1:
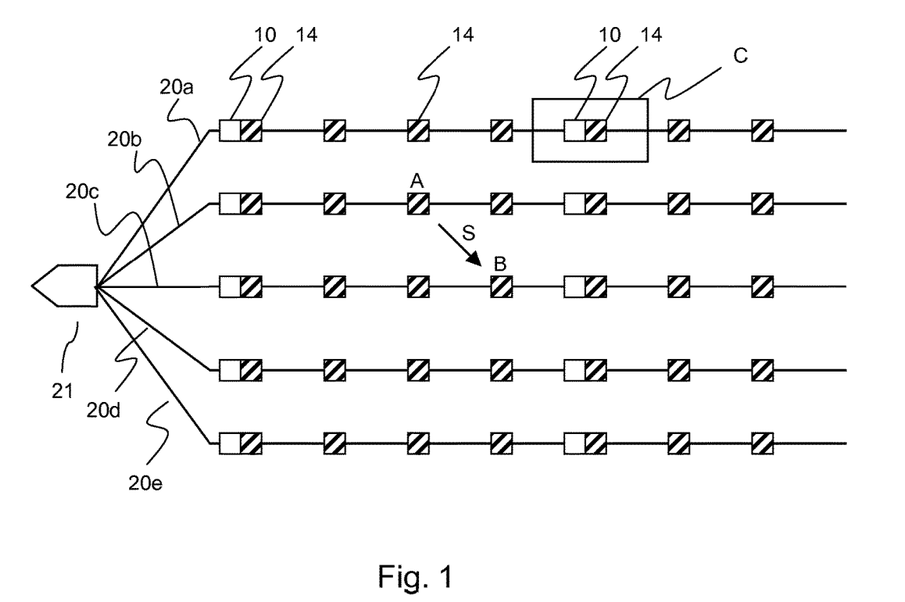
FIG. 1, already described with reference to the prior art, presents an example of network of seismic streamers towed by a seismic vessel.

The operations of acquiring seismic data on site conventionally use networks of seismic sensors, like accelerometers, geophones or hydrophones. We consider below the context of seismic data acquisition in a marine environment, in which the seismic sensors are hydrophones. The hydrophones are distributed along cables in order to form linear acoustic antennas normally (also referred to as "streamers" or "seismic streamers"). As shown in FIG. 1, the network of seismic streamers 20a to 20e is towed by a seismic vessel 21. The hydrophones are referenced 16 in FIG. 2, which illustrates in detail the block referenced C in FIG. 1 (i.e. a portion of the streamer referenced 20a).

The seismic method is based on an analysis of reflected seismic waves. Thus, to collect geophysical data in a marine environment, one or more submerged seismic sources are activated in order to propagate omnidirectional seismic wave trains. The pressure wave generated by the seismic source passes through the column of water and insonifies the different layers of the seabed. The reflected seismic waves (i.e. reflected acoustic signals) are then detected by the hydrophones distributed over the length of the seismic streamers. These acoustic signals are processed and retransmitted by telemetry from the seismic streamers to the operator station situated on the seismic vessel, where the processing of the raw data is carried out (in an alternative solution, the seismic acoustic signals are stored for a later processing).

During seismic surveys, it is important to precisely locate the streamers in particular for:
- monitoring the position of the hydrophones (distributed along the seismic streamers) in order to obtain a satisfactory precision of the image of the seabed in the exploration zone;
- detecting the movements of the streamers with respect to one another (the streamers are often subjected to various external natural constrains of variable magnitude, such as the wind, waves, currents); and
- monitoring the navigation of streamers, in particular in a situation of bypassing an obstacle (such as an oil barge).

Figure 2:
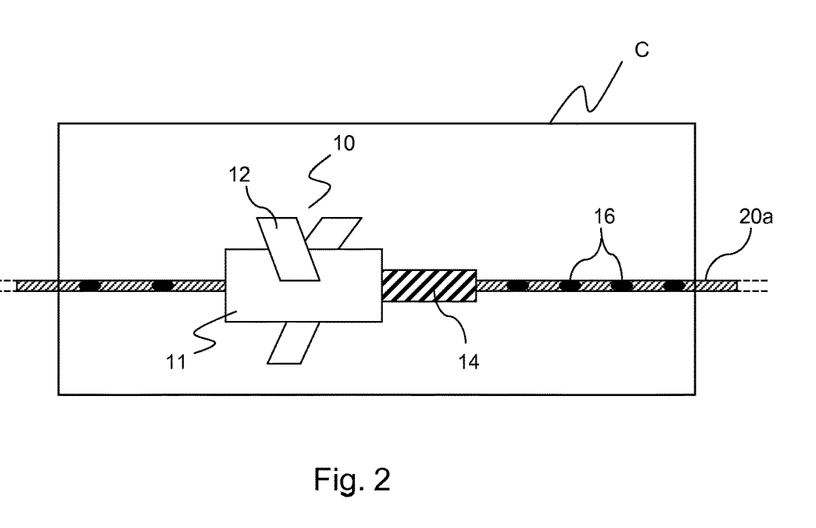
FIG. 2, already described with reference to the prior art, illustrates in detail the block referenced C in FIG. 1 (i.e. a portion of the streamer)

Control of the positions of streamers lies in the implementation of navigation control devices (also referred to as "birds") (white squares referenced 10 in FIG. 1). They are installed at regular intervals (every 300 meters for example) along the seismic streamers. The function of those birds is to guide the streamers between themselves. In other words, the birds are used to control the depth as well as the lateral position of the streamers. For this purpose, and as illustrated in FIG. 2, each bird 10 comprises a body 11 equipped with motorized pivoting wings 12 (or more generally means of mechanical moving) making it possible to modify the position of the streamers laterally between them (this is referred to a horizontal driving) and drive the streamers in immersion (this is referred to a vertical driving).

Seismic marine acquisition is usually performed close to the coast where fishermen have installed fishing nets. Some areas over the world are full of thousands of nets, which are not identified. Despite fishermen are requested to remove the nets and chase boats try to detect presence of nets, they are still many nets at sea, when the seismic vessel is working. Seismic streamers towed by vessel can easily catch fishing nets. The slanted shape of the streamers, in the current acquisition programs, increases the risk for a streamer to catch nets that float below the surface because the water column is more important. Since streamers are smooth, nets (or any inconvenient foreign objects) are sliding down the streamer, until they get caught by a prominent device which most often is a bird.

When a fishing net is caught by a bird:
- drag increase on the streamer;
- noise increases and can exceed the maximum noise tolerance (i.e. noise is too high compared with the useful seismic signal), which generates downtime;
- the bird can no more control depth with effect on the cable that can go out of the specified depth, which generates downtime;
- the bird can be unstable and can twist, with effect on the streamer that can twist and be damaged, which generates downtime.

There are several kinds of birds in the market, whose behavior is not the same in the presence of a net (or any inconvenient foreign object).

Birds of a first type (called "Bird In Line" or "BIL") are placed in series with the streamer, using connectors that supply power and data communication. See for example the following patent documents: U.S. Pat. No. 7,933,163, U.S. Pat. No. 7,206,254, US2009/0204274 and U.S. Pat. No. 7,080,607. These "BIL" comprise a body, in series with the streamer, and wings, which are interdependent with the body. These birds comprise, for each wing, a passive mechanical fuse which breaks to prevent the transmission of excessive mechanical stress to the bird and hence to the streamer. If a fishing net is caught by a wing, only this wing is released.

Birds of a second type (called "Bird In Parallel" or "BIP") are placed in parallel with the streamer, using quick latches attached to the streamer. See for example the following patent document: U.S. Pat. No. 6,525,992. Power is supplied by internal battery and data communication is done through contactless magnetic coils. If a fishing net is caught by a wing, quick latches are acting as passive mechanical fuse to release the entire bird (body and wings). A rope fixed to the streamer allows the bird to remain attached to the streamer when released.

Birds of a third type (e.g. Sercel's product called "Nautilus®" (registered trademark)) can be seen as a hybrid solution since they comprise (see bird 10 of FIG. 3): at least one module (not shown), placed in series along the streamer (not shown), and a body (tubular frame element) 11, freely rotating around the at least one module and placed in parallel with the streamer. Three wings are attached to the body 11: two motorized upper wings 12a, 12b and a lower non-motorized wing (keel) 12c. In a first embodiment, if a fishing net is caught by the bird, it is not expected to release one or several wings (there is a wing loss only by breaking). In a second embodiment, if a fishing net is caught by a wing, only this wing is released using a passive mechanical fuse (as for the birds of the first type).

All these birds (first, second or third type) have a common drawback: when a fishing net is caught by a wing (or several wings), lateral and/or vertical controls (previously carried out by the bird) are lost or no more managed correctly by the bird.

For birds of the second type (BIP), when the whole bird is released, lateral and/or vertical controls (previously carried out by the bird) are lost.

For birds of the first type (BIL), when at least one bird is released, lateral and/or vertical controls (previously carried out by the bird) is no more managed correctly by the bird.

For birds of the third type ("Nautilus®" solution), they become unstable when a fishing net is caught in the wings (bird rolls over the stability domain and twists around the streamer; the bird finally twists also the streamer on which it is fixed, until damaging the streamer) and both lateral and vertical controls are lost.

3. SUMMARY

A particular embodiment of the disclosure proposes an operation managing system for managing the operation of a navigation control device, the navigation control device being adapted for controlling the depth and/or the lateral position of a towed acoustic linear antenna and comprising a body to which is attached a set of wings. The operation managing system comprises means for operating the navigation control device according to a degraded operating mode, by acting on at least one non-released and motorized wing when detecting that at least one wing of the set of wings has been released or must be released.

The general principle is to drive the navigation control device according to a degraded operating mode, by acting on at least one non-released and motorized wing, when detecting that at least one wing of the set of wings has been released or must be released. This allows to keep at least a partial control of the streamer, after the release of the aforesaid at least one wing.

The release of the at least one wing can be of any kind. It may result from the use of a passive mechanical fuse or an active mechanical fuse, or even from an unwanted mechanical failure.

In a particular embodiment, said means for operating comprise:
 a wing loss decision circuit, for generating a wing loss signal when detecting that at least one wing of the set of wings has been released or must be released; and
 a driving circuit comprised in the navigation control device, for driving the navigation control device according to said degraded operating mode when receiving said wing loss signal, said degraded operating mode enabling to control at least the depth of the towed acoustic linear antenna.

In a first implementation, said at least one wing that has been released or must be released comprises an embedded magnet. Said operation managing system comprises a magnetic sensor, for measuring a whole magnetic field. Said wing loss decision circuit comprises: a circuit for detecting a change in the measured whole magnetic field, due to a movement away of the embedded magnet when said at least one wing is released; and a circuit for generating said wing loss signal, when said change in the measured whole magnetic field is detected.

This first implementation is easy to carry out and is usable with any type of release mechanism (passive mechanical fuse, active mechanical fuse, or even unwanted mechanical failure). In case an active mechanical fuse is used, this first implementation doesn't require any communication means between said mode switching decision circuit and another circuit (e.g. a releasing decision circuit as discussed below) whose function is to manage the active mechanical fuse.

In a second implementation, the operation managing system comprises: a releasing decision circuit, for generating a release request signal and a release information signal when detecting that a foreign object is caught by at least one wing of the set of wings; and an actuator, for releasing from the body said at least one wing of the set of wings, when receiving said release request signal. Said releasing detection circuit comprises a communication circuit for transmitting said release information signal to the wing loss decision circuit.

In this second implementation, an active mechanical fuse mechanism (releasing decision circuit and actuator) is used. This allows to optimally maintain a full integrity of the streamer (the streamer is protected from twisting and damages), and also a partial integrity of the bird (the wing is released without damage), in presence of fishing nets or any inconvenient foreign objects, while being reliable (avoiding unwanted quick release of the wing), autonomous (automatic and quick release of the wing) and cost efficient. There is a communication circuit (means) between the wing loss decision circuit and the releasing decision circuit, in order to provide the release information signal. But there is no need for a further circuit for detecting the release of the at least one wing.

According to a particular feature, said releasing decision circuit comprises:
 means for obtaining at least one measure of a parameter representative or related to a load applied on said at least one wing of the set of wing or wings;
 means for deciding, automatically or through a man-machine interface, whether a foreign object is caught by said at least one wing of the set of wing or wings, based on said at least one measure; and
 means for generating the release request signal if said means for deciding have decided that a foreign object is caught.

Since the releasing decision circuit takes a decision (i.e. generates the release request signal which is then used as an input by the actuator) as a function of at least one measure, this decision is more precise and appropriate than the release obtained in the prior art with a passive mechanical fuse. This decision can be taken automatically (e.g. when the releasing decision circuit is comprised in the navigation control device or in a management system on board a vessel) or through a man-machine interface (e.g. when the releasing decision circuit is comprised in a management system on board a vessel).

According to a particular feature, said means for deciding comprise signal processing means, with programmable settings.

This allows to limit the false detections and to have a programmable solution. With the programmable settings, there is no need for a mechanical resizing (contrary to a passive mechanical fuse).

According to a particular feature, said at least one measure belongs to the group comprising:
- measures, from a load sensor comprised in the navigation control device, of a load applied on said at least one wing of the set of wing or wings;
- measures of a noise on data from one or several hydrophones distributed along the towed acoustic linear antenna;
- measures of a noise on the towed acoustic linear antenna; and
- measures of a motor consumption of at least one motorized wing of the set of wing or wings.

This list of measures is not exhaustive.

In a first particular case, the wing loss decision circuit is comprised in the navigation control device.

In this first particular case, the whole operation managing system is comprised in the navigation control device, and the latter can operate independently (the wing loss decision is taken locally, in the navigation control device).

In a first example of the first particular case, the navigation control device comprises a module placed in series along the towed acoustic linear antenna. Said body freely rotates around said module. Said wing loss decision circuit is comprised in said module.

This first example is an adaptation of the existing birds of the third type (e.g. Sercel's product called "Nautilus®").

In a second example of the first particular case, the body of the navigation control device comprises a module placed in series along the towed acoustic linear antenna. Said wing loss decision circuit is comprised in said module.

This second example is an adaptation of the existing birds of the first type ("Bird In Line").

According to a particular feature, the operation managing system comprises a circuit for transmitting said wing loss signal, as an alarm signal, to a management system on board a vessel.

Thus the operator is informed when a wing is released.

In a second particular case, said wing loss decision circuit is comprised in a management system on board a vessel, and the operation managing system further comprises:
- a transmitting circuit, comprised in the management system, for transmitting the wing loss signal to the actuator, and
- a receiving circuit, comprised in the navigation control device, for receiving the wing loss signal.

In this second particular case, the operation managing system is distributed: the driving circuit is comprised in the navigation control device and the wing loss decision circuit is on board the vessel. The navigation control device does not operate independently since the wing loss decision is taken on board the vessel.

According to a particular feature, the navigation control device comprises two motorized upper wings and a lower non-motorized wing. The degraded operating mode is defined by at least one of the following rules:
- when the lower non-motorized wing is released, the means for operating act on the two motorized upper wings to keep them symmetrical with respect to a longitudinal axis of the body and to control the depth of the towed acoustic linear antenna; and
- when one of the two motorized upper wings is released, the means for operating act on the other of the two motorized upper wings to control the depth of the towed acoustic linear antenna and to control an angle of attack at 0°, relative to a flow of water.

Another particular embodiment of the disclosure proposes a method for managing the operation of a navigation control device adapted for controlling the depth and/or the lateral position of a towed acoustic linear antenna and comprising a body to which is attached a set of wings. The method comprises a step of operating the navigation control device according to a degraded operating mode, by acting on at least one non-released and motorized wing, when detecting that at least one wing of the set of wings has been released or must be released.

According to a particular feature, said step of operating comprises:
- a wing loss decision step, for generating a wing loss signal when detecting that at least one wing of the set of wings has been released or must be released; and
- a driving step, for driving the navigation control device according to said degraded operating mode when receiving said wing loss signal, said degraded operating mode enabling to control at least the depth of the towed acoustic linear antenna.

4. LIST OF FIGURES

Other features and advantages of embodiments of the disclosure shall appear from the following description, given by way of an indicative and non-exhaustive examples and from the appended drawings, of which.

5. DETAILED DESCRIPTION

In all of the figures of the present document, identical elements and steps are designated by the same numerical reference sign.

Figure 3:
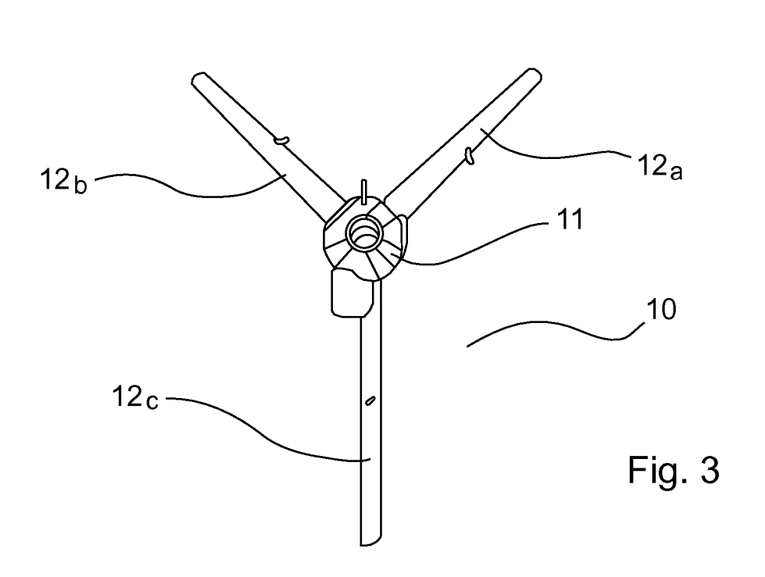
FIG. 3, already described with reference to the prior art, is a perspective view of a known bird.

FIGS. 1 to 3, which relate to the prior art, have already been described above and are not discussed again.

In all of the figures of the present document, identical elements and steps are designated by the same numerical reference sign.

FIGS. 1 to 3, which relate to the prior art, have already been described above and are not discussed again.

Figure 4:
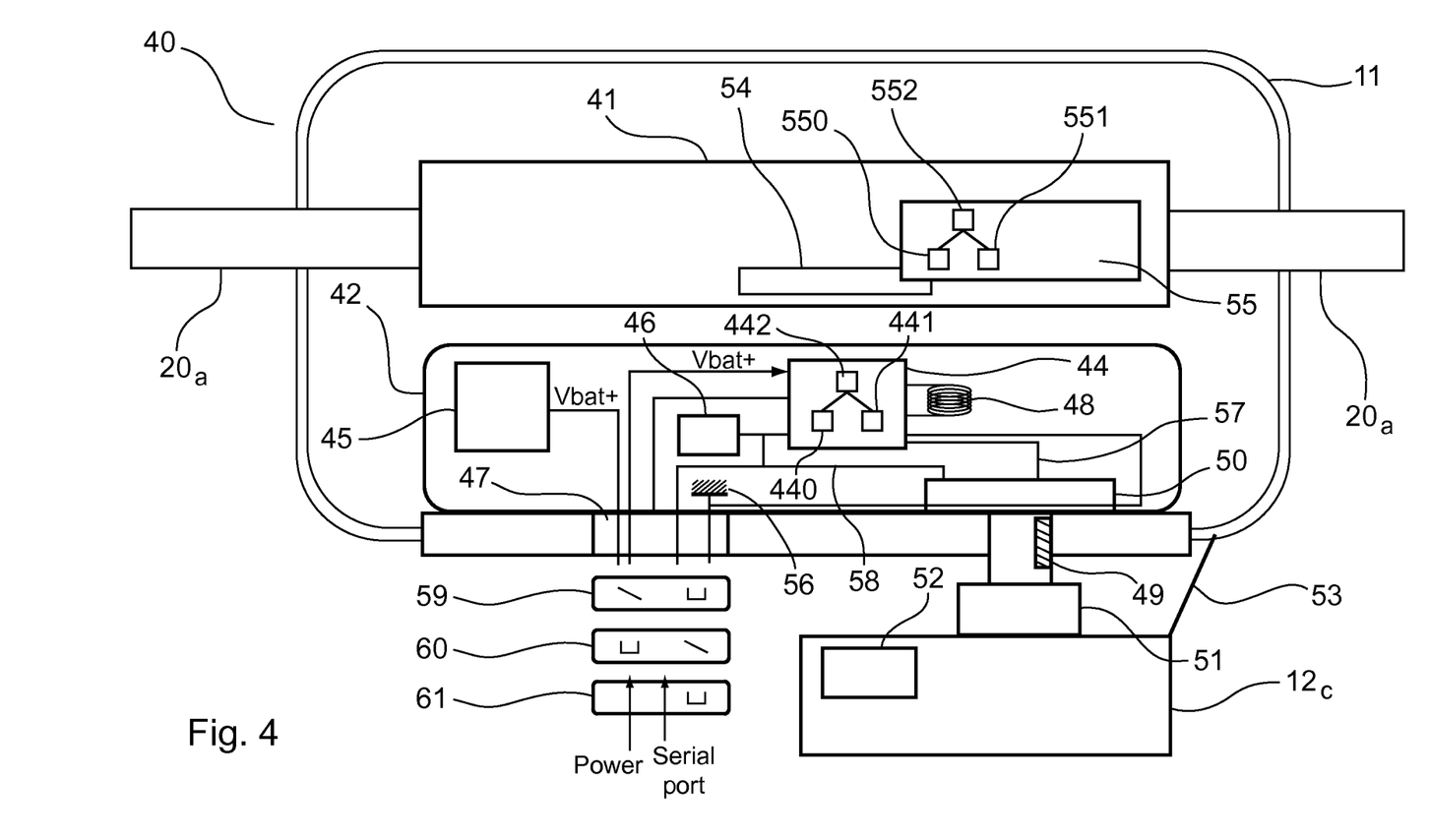
FIG. 4 provides a schematic illustration of a bird, a wing releasing system and an operation managing system according to a first embodiment of the disclosure.
Figure 5:
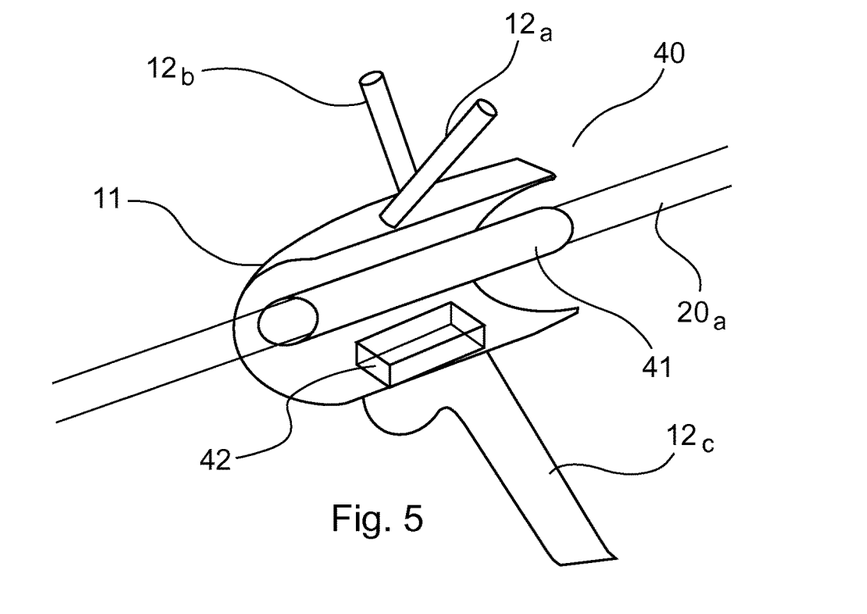
FIGS. 5 and 6 provide partial views (schematic perspective view and schematic side view respectively) of the bird, the wing releasing system and the operation managing system according to the first embodiment of FIG. 4.
Figure 6:
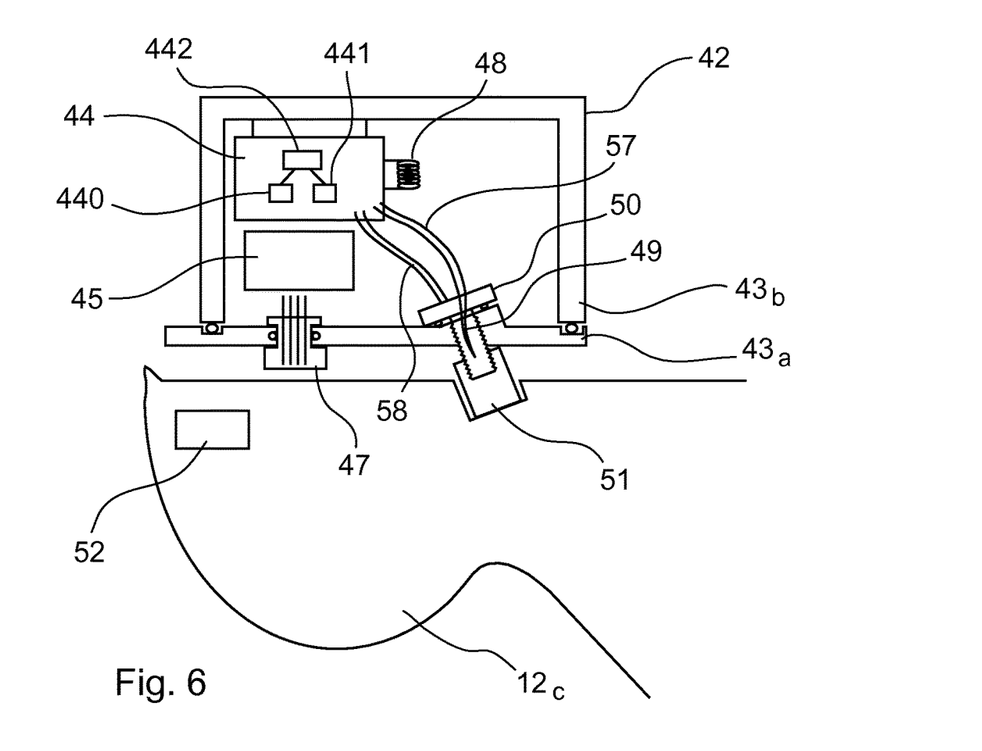

We now present, in relation to FIGS. 4, 5 and 6, a bird 40, a wing releasing system 42 and an operation managing system 55, according to a first embodiment of the disclosure.

The bird 40 comprises:

- an inline module 41 placed in series along the streamer 20*a* and comprising a magnetic sensor 54 (like a magnetometer, a compass or a hall sensor) and electronics 55. As an inline module of the prior art, it provides depth control and lateral control (steering). Its additional features, forming an operation managing system 55 according to a particular embodiment of the disclosure, are described below;
- a body (tubular frame element) 11, freely rotating around the module 41. A swivel (not shown) can be used to ease rotation of the body 11 around the inline modules 41, under tension;
- wings attached to the body: two motorized upper wings 12*a*, 12*b* and a lower non-motorized wing (keel) 12*c*. When released (as detailed below), the lower wing 12*c* is retained by a rope 53 attached to the body 11. The lower wing 12*c* has an embedded magnet 52.

In the first embodiment, the wing releasing system is a wing releasing device 42, which is inside the body 11 and used to release the lower wing 12*c* from the body 11, when it detects that a foreign object (e.g. a fishing net) is caught by the lower wing 12*c*. In an alternative embodiment, the wing releasing device is inside the lower wing 12*c*, or any wing to release. In another alternative embodiment, the wing releasing device is inside the inline module 41.

In the first embodiment, the wing releasing device 42 comprises a small size watertight housing (composed of a base 43*a* and a lid 43*b*) which contains:

- electronics 44, comprising signal processing means (with programmable settings to limit false detections related to deployment/recovery in high seas, workboat operations, back deck operations, maintenance and storage), for performing the function of a releasing decision circuit, i.e. for deciding whether a foreign object (e.g. a fishing net) is caught by the lower wing 12*c* (as detailed below). The electronics 44 is also referred to as "releasing decision circuit" comprising different means (means for obtaining at least one measure of a parameter representative or related to a load applied on at least one wing; means for deciding, automatically or through a man-machine interface, whether a foreign object is caught by said at least one wing, based on said at least one measure; and means for generating a release request signal if the means for deciding have decided that a foreign object is caught). It generates the release request signal (to activate an actuator 50), e.g. as a function of a load signal (generated by a load sensor 49). Electronics 44 can comprise an embedded memory 440 to log events, record load cases and finally continuously improve the system;
- a main battery 45 and an auxiliary battery 46 (e.g. low aging at 50° C., high power density, rechargeable);
- a watertight connector 47;
- a wireless communication circuit 48 (typically using RFID, NFC, Zigbee, Bluetooth or wifi), for communication between the electronics 44 and the inline module 41 (e.g. to transmit a signal indicating the release of the lower wing, in an alternative embodiment without the wireless magnetic feedback detailed below), and/or between the electronics 44 and back deck of a seismic vessel (to perform deployment tests, to set quickly new parameters, . . . ). In an alternative embodiment described below with FIG. 8, the wireless communication circuit 48 is used to receive a release request signal from a management system on board the vessel 21;
- the load sensor 49 (e.g. mechanical or optical), for generating a load signal representative of a load applied on the lower wing 12*c*. It is electrically connected to the electronics 44 by a link 57. It is for example a strain gage with pulsed power (to reduce consumption), fixed on the body and/or the lower wing 12*c* (not in direct contact with sea for robustness and avoid corrosion) and low consuming. In an alternative embodiment, the load sensor is a strain gauge of the spring type; and
- the actuator 50, for releasing the lower wing 12*c* from the body 11, when receiving the release signal generated by the electronics 44. The actuator 50 is electrically connected to the electronics 44 by a link 58 (on which the release request signal is transmitted), and attached to the shaft 51 of the lower wing 12*c*. The actuator is for example an electromagnet, a piston, an inflatable bag, a frangible bolt, a pyromechanism, etc.). In a particular embodiment, it is compact, low powered and not in contact with sea water for robustness and corrosion.

The watertight connector 47 is watertight even in open face. It is connected to the electronics 44, the actuator 50, the main battery 45, the auxiliary battery 46 and the ground 56, and comprises means for cooperation with a shunting dongle 59, a passing dongle 60 or a bench 61. During transportation, the shunting dongle 59 is screwed to the watertight connector 47, in order to desactivate (shortcut) the actuator 50 and disconnect (open) the main battery 45 from the electronics 44. At sea, the passing dongle 60 is screwed to the watertight connector 47, in order to activate the actuator 50 and connect the main battery 45 to the electronics 44. On-board (on the back deck of the seismic vessel 21), the watertight connector 47 is connected to the bench 61, in order to desactivate the actuator 50, charge the main battery 45 (via a power line) and exchange data with the electronics 44 (via a serial port) (e.g. for downloading new firmware and retrieve data).

Figure 7:
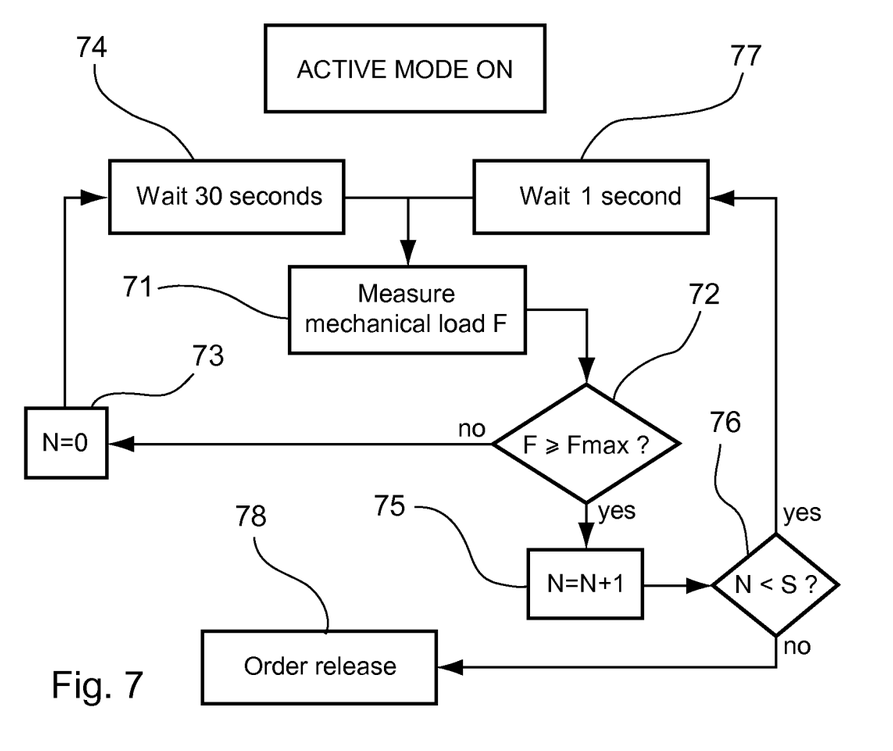
FIG. 7 is a flowchart of an algorithm implemented by the releasing decision circuit shown in FIGS. 4 and 6.

We now describe the operation of the wing releasing device 42. When a fishing net (or any other foreign object) hits the lower wing 12*c*, drag applied to it increases and generates deflection of materials. The mechanical load sensor 49 (e.g. strain gage) is elongating accordingly and its resistance is evolving proportionally to the mechanical load. As shown in FIG. 7, an algorithm is implemented by the electronics 44 (i.e. the "releasing decision circuit"). In step 71, the electronics 44 receives from the mechanical load sensor 49 a measure of the mechanical load F. In test step 72, the electronics 44 compares this measure F with a threshold Fmax. In case of negative answer (i.e. if F<Fmax), the process goes to step 73, in which the counter N is set to 0, and then to step 74, which is a waiting step of 30 seconds, before returning to step 71. In case of affirmative answer, the process goes to step 75, in which the counter N is incremented by one, and then to test step 76, in which the electronics 44 compares N with a threshold (e.g. equal to 5). If N<5, then the process goes to step 77, which is a waiting step of 1 second, before returning to step 71. Otherwise, the process goes to step 78, in which the release request signal is generated (it is used to order the actuator 50 to release the lower wing 12*c* and associated shaft 5).

In the first embodiment described above, the electronics 44 ("releasing decision circuit") generates automatically a release request signal (used to activate an actuator 50), as a function of a load signal generated by a load sensor 49.

Alternative embodiments are possible since the electronics 44 ("releasing decision circuit") can generate the release request signal as a function of other types of measures, provided that these measures concern a parameter representative or related to a load applied on a wing. For example, it is possible any of the followings measures (this list is not exhaustive):

measures of a noise on data from one or several hydrophones (16) distributed along the streamer 20a (these measures are visible directly from the seismic traces derived from the hydrophones; a wing release decision can be made by analyzing these seismic traces, visually (by an operator who provides his decision via a man-machine interface) or even from a suitable algorithm (with template for example) in the case of an automatic solution);

measures of a noise on the streamer 20a (these measures are obtained by load sensors placed along the cable, ideally in the vicinity of the birds, in order to measure an elongation or a shrinkage of the cable: e.g. elongation if a foreign object (e.g. a fishing net) does not tangle with the cable but is only pulled by the bird, and shrinkage (narrowing) if the fishing net wraps around the bird);

measures of a motor consumption of at least one motorized wing 12a, 12b;

. . .

Also, in alternative embodiments, when the releasing decision circuit is comprised in a management system on board a vessel (see FIG. 8 described below), it can generate the release request signal either automatically or not. In the second case, an operator on board the vessel is provided with the measures (which are e.g. displayed on a screen), decides whether a foreign object is caught by the wing, and provides his decision (through a man-machine interface) to the releasing decision circuit which then generates the release request signal (if the operator has decided that a foreign object is caught).

We now describe the operation of the inline module 41. The magnetic sensor 54 (e.g. magnetometer) measures the whole magnetic field created by the environment, including: Earth magnetic field, magnetic field generated by the electronics 55, wires inside the inline module 41 and magnetic field generated by the magnet 52 situated inside the lower wing 12c. When the lower wing 12c is released (see above description of the operation of the wing releasing device 42), its magnet 52 moves far away from the magnetic sensor 54, the magnetic sudden change is detected as follows.

The electronics 55 carries out several functions (each of these functions can be seen like a specific circuit of an operation managing system):

first function ("wing loss decision circuit"): it processes data coming from the magnetic sensor 54 and detects the change related to the released wing 12c (i.e. a wireless magnetic feedback is used to give status of presence/absence of the lower wing 12c). When the change is detected, it generates a wing loss signal (also referred to as "absence signal");

second function ("alarm circuit"): it raises and sends an alarm (absence signal) to a management system on-board the seismic vessel, so that the operator is informed that the lower wing 12c has been released;

third function ("driving circuit"): when receiving the wing loss signal, it drives the bird according to a degraded operating mode, by adapting the behaviour of the two motorized upper wings 12a and 12b. By adjusting the upper wings at the same angle of attack, twisting is reduced or removed. If twisting is removed, then all hydrodynamic forces are used to lift the streamer and so maintain a target vertical depth. In other words, when the lower non-motorized wing 12c is released, the driving circuit acts on the two motorized upper wings 12a, 12b to keep them symmetrical with respect to a longitudinal axis of the body 11 and to control the depth of the streamer 20a.

In an alternative embodiment (without wireless magnetic feedback) of the first function, the electronics 55 receives (from the electronics 44, via the radio communication means 48) a release information signal indicating the release of the lower wing 12c.

In an alternative embodiment, the degraded operating mode is defined as follows, when one of the two motorized upper wings 12a, 12b is released: the driving circuit (electronics 55) acts on the other of the two motorized upper wings to control the depth of the streamer 20a and to control an angle of attack at 0°, relative to a flow of water.

In a particular embodiment, electronics 44 (comprised in the wing releasing device 42) and electronics 55 (comprised in the inline module 41) each comprise a read-only memory (ROM) 440, 550, a random access memory (RAM) 441, 551 and a processor 442, 552. The read-only memory 440, 550 is a non-transitory computer-readable carrier medium. It stores executable program code instructions, which are executed by the processor 442, 552 in order to enable implementation of the functions described above (see also FIG. 7 for the function executed by the electronics 44 comprised in the wing releasing device 42). Upon initialization, the aforementioned program code instructions are transferred from the read-only memory 440, 550 to the random access memory 441, 551 so as to be executed by the processor 442, 552. The random access memory 441, 551 likewise includes registers for storing the variables and parameters required for this execution.

All the steps of the methods executed by electronics 55 and electronics 44 can be implemented equally well:

by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or by a dedicated machine or component, such as an FPGA (Field Programmable Gate Array), an ASIC (Application-Specific Integrated Circuit) or any dedicated hardware component.

Although the present disclosure has been described with reference to one or more examples, workers skilled in the art will recognize that changes may be made in form and detail without departing from the scope of the disclosure and/or the appended claims.

The proposed solution is not limited to the release of the lower wing 12c, and can be implemented with one or several wings (among the set of wings of the birds).

The proposed solution is not limited to the release of wing or wings of birds of the third type (e.g. Sercel's product called "Nautilus®"). Notably, it can also be implemented with birds of the first type ("Bird In Line"), i.e. when the body of the bird comprises a module placed in series along the streamer, and in that case the releasing decision circuit is comprised in the module or in one or several of the wings.

In an alternative embodiment, the release of the lower wing 12c (or any other wing) is carried out by a passive mechanical fuse, and there is no releasing device 42. The wireless magnetic feedback (used to give status of presence/absence of the released wing 12c), already described above, is unchanged: the lower wing 12c has an embedded magnet 52, and the electronics 55 processes data coming from the magnetic sensor 54 and detects the change related to the released wing 12c (aforesaid first function).

Figure 8:
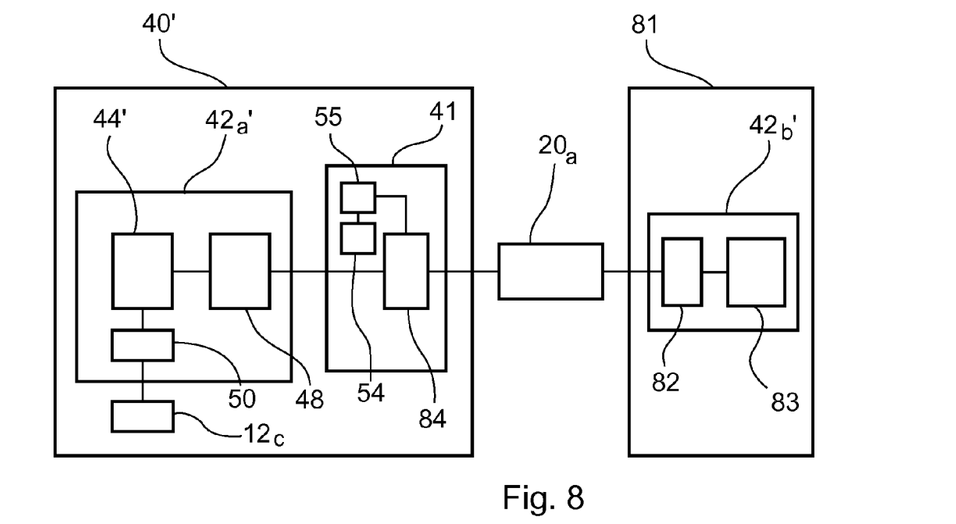
FIG. 8 provides a schematic illustration of a bird, a wing releasing system and an operation managing system according to a second embodiment of the disclosure.

We now present, in relation to FIG. 8, a bird 40', a wing releasing system 42a', 42b' and an operation managing system 55 according to a second embodiment of the disclosure.

The bird 40' of the second embodiment differs from the bird 40 of the first embodiment (see FIG. 4) in that the electronics referenced 44' in FIG. 8 provides the release request signal to the actuator 50 (for releasing the lower wing 12c), but does not generate it. In other words, the electronics 44' does not perform the function of the releasing decision circuit. The releasing decision circuit 83 is comprised in a management system 81, on board the vessel 21.

More precisely, the wing releasing system comprises:
- a first part 42b' (in the management system 81 on board the vessel (21) comprising the releasing decision circuit 83 and a transmitting circuit 82 (for transmitting the release request signal to the bird 40', via the streamer 20a); and
- a second part 42a' (in the bird 40') comprising the electronics 44', the actuator 50, the wireless communication circuit 48 (for receiving the release request signal, via the streamer 20a and a receiving circuit 84 comprised in the inline module 41).

The releasing decision circuit 83, comprised in the management system on board the vessel, can generate the release request signal either automatically (as the electronics 44 in the embodiment of FIG. 4) or not. In the second case, an operator on board the vessel is provided with the measures (which are e.g. displayed on a screen), decides whether a foreign object is caught by the wing, and provides his decision (through a man-machine interface) to the releasing decision circuit 83 which then generates the release request signal (if the operator has decided that a foreign object is caught).

The operation managing system 55 is the same as in the first embodiment.

Figure 9:
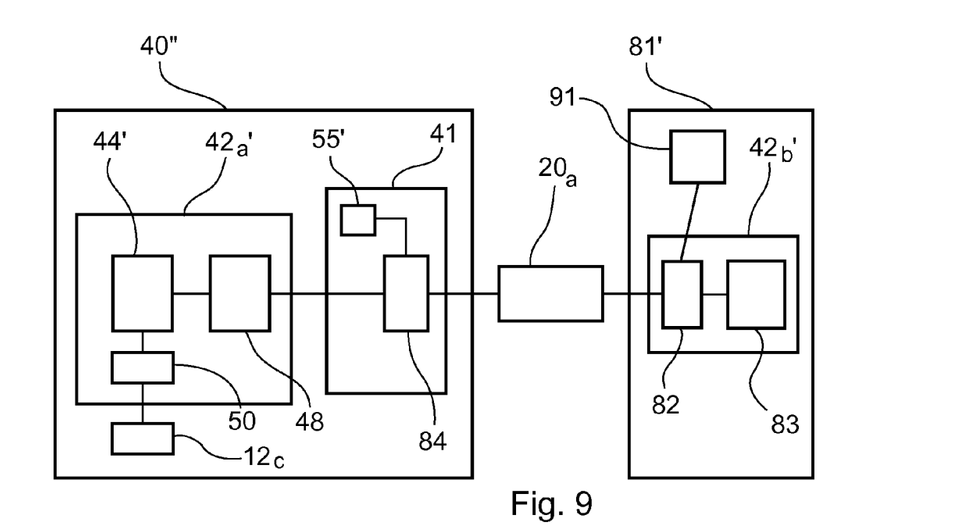
FIG. 9 provides a schematic illustration of a bird, a wing releasing system and an operation managing system according to a third embodiment of the disclosure.

We now present, in relation to FIG. 9, a bird 40", a wing releasing system 42a', 42b' and an operation managing system 55', 91 according to a third embodiment of the disclosure.

The bird 40" of the third embodiment differs from the bird 40' of the second embodiment (see FIG. 8) in that the electronics referenced 55' in FIG. 9 carries out the third function ("driving circuit"), but not the first function ("wing loss decision circuit"). The wing loss decision circuit 91 is comprised in the management system 81, on board the vessel 21.

More precisely, the operation managing system comprises:
- a first part (in the management system 81 on board the vessel 21) comprising the wing loss decision circuit 91 and the transmitting circuit 82 (used in the present case for transmitting also the wing loss signal to the bird 40", via the streamer 20a); and
- a second part (in the bird 40") comprising the electronics 55' and the receiving circuit 84 (for receiving in the present case the wing loss signal, via the streamer 20a).

The wing releasing system 42a', 42b' is the same as in the second embodiment.

In a particular implementation, the releasing decision circuit 83 transmits the release request signal (or the release information signal) to the wing loss decision circuit 91, and when the latter 91 receives the release request signal (or the release information signal) it transmits the wing loss signal to the electronics 55' in order to trigger the degraded operating mode.

At least one embodiment of the disclosure provides a technique allowing to maintain at least partially the control of the streamer, in presence of fishing nets (or any inconvenient foreign objects)

At least one embodiment of the disclosure provides a technique which is reliable.

At least one embodiment of the disclosure provides a technique in which the navigation control device (bird) is autonomous.

At least one embodiment of the disclosure provides a technique which is cost efficient.

The invention claimed is:

1. An operation managing system for managing operation of a navigation control device, the navigation control device being adapted for controlling depth and/or lateral position of a towed acoustic linear antenna and comprising a body to which is attached a set of wings, the operation managing system comprising:
   means for detecting that at least one wing of the set of wings has been or is released, said means for detecting comprising a wing loss decision circuit, configured to generate a wing loss signal when detecting that at least one wing of the set of wings has been or is released; and
   means for operating the navigation control device according to a degraded operating mode, by acting on at least one non-released and motorized wing when the means for detecting detects that at least one wing of the set of wings has been or is released, said means for operating comprising a driving circuit comprised in the navigation control device and configured to drive the navigation control device according to said degraded operating mode when receiving said wing loss signal, said degraded operating mode enabling to control at least the depth of the towed acoustic linear antenna,
   wherein said at least one wing that has been or is released comprises an embedded magnet,
   wherein said operation managing system comprises a magnetic sensor, for measuring a whole magnetic field, and
   wherein said wing loss decision circuit comprises:
   a circuit configured to detect a change in the measured whole magnetic field, due to a movement away of the embedded magnet when said at least one wing is released; and
   a circuit configured to generate said wing loss signal, when said change in the measured whole magnetic field is detected.

2. The operation managing system according to claim 1, wherein the wing loss decision circuit is comprised in the navigation control device.

3. The operation managing system according to claim 2, the navigation control device comprising a module placed in series with two portions of the towed acoustic linear antenna, said body being rotatable around said module, and wherein said wing loss decision circuit is comprised in said module.

4. The operation managing system according to claim 2, the body of the navigation control device comprising a module placed in series with two portions of the towed acoustic linear antenna, and wherein said wing loss decision circuit is comprised in said module.

5. The operation managing system according to claim 2, wherein the system comprises a circuit configured to transmit said wing loss signal, as an alarm signal, to a management system on board a vessel.

6. The operation managing system according to claim 1, wherein said wing loss decision circuit is comprised in a management system on board a vessel, and the operation managing system further comprises:
   a transmitting circuit, comprised in the management system, which transmits the wing loss signal to the navigation control device, and
   a receiving circuit, comprised in the navigation control device, which receives the wing loss signal.

7. The operation managing system according to claim 1, the navigation control device comprising two motorized upper wings and a lower non-motorized wing, wherein the degraded operating mode is defined by at least one of the following rules:
   when the lower non-motorized wing is released, the means for operating act on the two motorized upper wings to keep them symmetrical with respect to a longitudinal axis of the body and to control the depth of the towed acoustic linear antenna; and
   when one of the two motorized upper wings is released, the means for operating act on the other of the two motorized upper wings to control the depth of the towed acoustic linear antenna and to control an angle of attack at 0°, relative to a flow of water.

8. An operation managing system for managing operation of a navigation control device, the navigation control device being adapted for controlling depth and/or lateral position of a towed acoustic linear antenna and comprising a body to which is attached a set of wings, the operation managing system comprising:
   means for detecting that at least one wing of the set of wings has been or is released, said means for detecting comprising a wing loss decision circuit, configured to generate a wing loss signal when detecting that at least one wing of the set of wings has been or is released; and
   means for operating the navigation control device according to a degraded operating mode, by acting on at least one non-released and motorized wing when the means for detecting detects that at least one wing of the set of wings has been or is released, said means for operating comprising a driving circuit comprised in the navigation control device and configured to drive the navigation control device according to said degraded operating mode when receiving said wing loss signal, said degraded operating mode enabling to control at least the depth of the towed acoustic linear antenna,
   a releasing decision circuit configured to generate a release request signal and a release information signal when detecting that a foreign object is caught by at least one wing of the set of wings; and
   an actuator, which releases from the body said at least one wing of the set of wings, when receiving said release request signal;
   wherein said releasing detection circuit comprises a communication circuit, which transmits said release information signal to the wing loss decision circuit.

9. The operation managing system according to claim 8, wherein said releasing decision circuit comprises:
   means for obtaining at least one measure of a parameter representative or related to a load applied on said at least one wing of the set of wing or wings;
   means for deciding, automatically or through a man-machine interface, whether a foreign object is caught by said at least one wing of the set of wing or wings, based on said at least one measure; and
   means for generating the release request signal if said means for deciding have decided that a foreign object is caught.

10. The operation managing system according to claim 9, wherein said at least one measure belongs to the group consisting of:
   measures, from a load sensor comprised in the navigation control device, of a load applied on said at least one wing of the set of wing or wings;
   measures of a noise on data from one or several hydrophones distributed along the towed acoustic linear antenna;
   measures of a noise on the towed acoustic linear antenna; and
   measures of a motor consumption of at least one motorized wing of the set of wing or wings.

11. The operation managing system according to claim 8, wherein the wing loss decision circuit is comprised in the navigation control device.

12. The operation managing system according to claim 11, the navigation control device comprising a module placed in series with two portions of the towed acoustic linear antenna, said body being rotatable around said module, and wherein said wing loss decision circuit is comprised in said module.

13. The operation managing system according to claim 11, the body of the navigation control device comprising a module placed in series with two portions of the towed acoustic linear antenna, and wherein said wing loss decision circuit is comprised in said module.

14. The operation managing system according to claim 11, wherein the system comprises a circuit configured to transmit said wing loss signal, as an alarm signal, to a management system on board a vessel.

15. The operation managing system according to claim 8, wherein said wing loss decision circuit is comprised in a management system on board a vessel, and the operation managing system further comprises:
   a transmitting circuit, comprised in the management system, which transmits the wing loss signal to the navigation control device, and
   a receiving circuit, comprised in the navigation control device, which receives the wing loss signal.

16. The operation managing system according to claim 8, the navigation control device comprising two motorized upper wings and a lower non-motorized wing, wherein the degraded operating mode is defined by at least one of the following rules:
   when the lower non-motorized wing is released, the means for operating act on the two motorized upper wings to keep them symmetrical with respect to a longitudinal axis of the body and to control the depth of the towed acoustic linear antenna; and
   when one of the two motorized upper wings is released, the means for operating act on the other of the two motorized upper wings to control the depth of the towed acoustic linear antenna and to control an angle of attack at 0°, relative to a flow of water.

* * * * *